(12) United States Patent
Kim et al.

(10) Patent No.: US 8,059,164 B2
(45) Date of Patent: Nov. 15, 2011

(54) PHOTOGRAPHING DEVICE INCLUDING FACE RECOGNITION, DISTANCE CALCULATION, AND DISTANCE COMPARISON UNITS AND METHOD OF CONTROLLING THE SAME

(75) Inventors: Eun-ho Kim, Changwon (KR); Byoung-kwon Lee, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 12/291,307

(22) Filed: Nov. 6, 2008

(65) Prior Publication Data
US 2009/0115868 A1  May 7, 2009

(30) Foreign Application Priority Data
Nov. 7, 2007  (KR) .................. 10-2007-0113211

(51) Int. Cl.
*H04N 5/228*  (2006.01)

(52) U.S. Cl. ................... 348/222.1; 382/118

(58) Field of Classification Search ............... 348/211.1; 382/118
See application file for complete search history.

(56) References Cited

U.S. PATENT DOCUMENTS

| | | | | |
|---|---|---|---|---|
| 5,890,021 A | * | 3/1999 | Onoda ................... | 396/121 |
| 6,895,181 B2 | * | 5/2005 | Nonaka et al. ........... | 396/125 |
| 2004/0239777 A1 | * | 12/2004 | Nakamura et al. ....... | 348/239 |
| 2006/0061598 A1 | * | 3/2006 | Mino et al. .............. | 345/629 |

FOREIGN PATENT DOCUMENTS

KR  10-2005-0034490 A  4/2005

* cited by examiner

*Primary Examiner* — Timothy J Henn
*Assistant Examiner* — Usman Khan
(74) *Attorney, Agent, or Firm* — Drinker Biddle & Reath LLP

(57) ABSTRACT

A photographing device for photographing a subject is provided. The photographing device includes a face recognition unit recognizing a face included in an image of the subject; a distance calculation unit calculating a distance between each of a plurality of faces when the plurality of faces are recognized by the face recognition unit; and a distance comparison unit comparing the distance calculated by the distance calculation unit with a pre-set reference distance. A of controlling the photographing device is also provided.

14 Claims, 7 Drawing Sheets

311

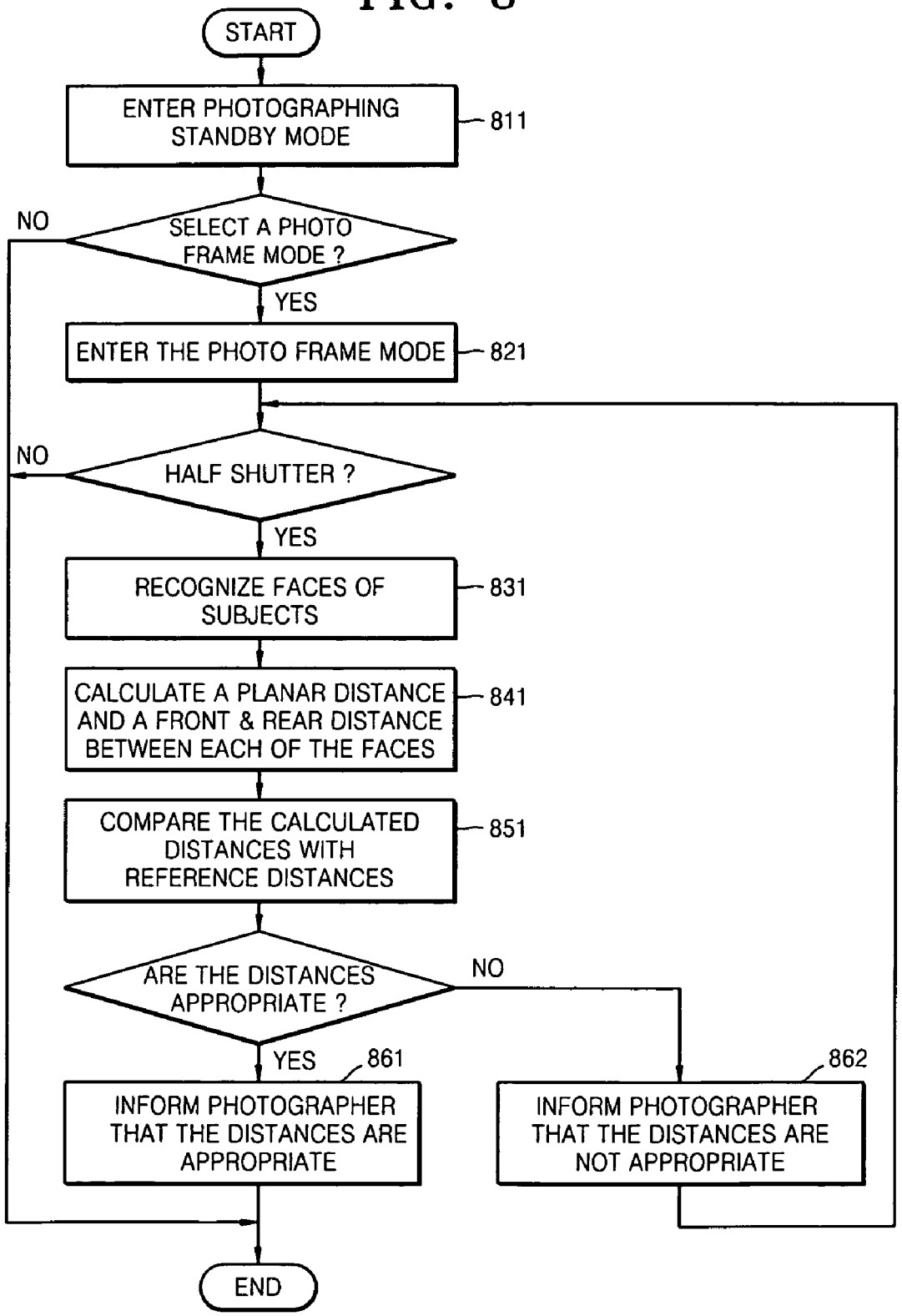

PHOTOGRAPHING DEVICE INCLUDING FACE RECOGNITION, DISTANCE CALCULATION, AND DISTANCE COMPARISON UNITS AND METHOD OF CONTROLLING THE SAME

CROSS-REFERENCE TO RELATED PATENT APPLICATION

This application claims the benefit of Korean Patent Application No. 10-2007-0113211 filed on Nov. 7, 2007 in the Korean Intellectual Property Office, the entire contents of which is incorporated herein by reference.

BACKGROUND OF THE INVENTION

1. Field of the Invention

The present invention relates to a photographing device and a method of controlling the photographing device. More particularly, the present invention relates to a photographing device which photographs a subject, and a method of controlling the photographing device which can easily determine an appropriate distance between each target subject face and can perform photographing.

2. Description of the Related Art

Digital cameras generate an image file by using a photographed image and store the image file in a memory. In this manner, digital cameras do not use a film such as that utilized in analog film cameras. As a result, digital cameras are not so expensive with respect to photographing an image as compared to traditional analog film cameras. In other words, if a digital camera has a memory with a large capacity, then it can photograph and store a large number of images. Also, digital cameras can transmit images stored in a memory to a computer or a web server via a connecting medium or a network so that the computer or the web server can store the images. As a result of such advantages, digital cameras have rapidly become widespread among general users.

General users of digital cameras desire digital cameras to be more convenient to use. They also desire sharper photographed pictures. Research and development with the aim of satisfying such user desires has been actively conducted, resulting in the development of face recognition technology for a portrait picture.

This face recognition technology has been improved to increase face detection techniques and face detection speed. More particularly, this face recognition technology has been developed to improve general face recognition techniques such as a face detection techniques, a search success rate according to left and right angles of a face, the number of searchable faces from among many target subjects, and the like.

Because digital cameras are frequently utilized to photograph human subjects, such face recognition technology can be usefully employed to select and to automatically focus a human subject deemed important to a user from among many human subjects. Conventionally, face recognition technology is utilized to simply select and to automatically focus such an important subject from among a plurality of subjects. For example, face recognition technology has improved in order to focus the functional development of face recognition techniques in ways such as the improvement of rapid subject recognition, development of standards regarding selection of a subject from among various subjects, and the like. According to recent developments, by utilizing face recognition technology, a user can focus a face and simultaneously perform autofocus (AF), auto white balance (AWB), or auto exposure (AE). This enables the user to obtain sharp portrait pictures. Accordingly, there is a current demand for the even further development of various techniques using face recognition technology.

SUMMARY OF THE INVENTION

The present invention provides a photographing device and a method of controlling the photographing device which calculates a distance between each face included in a photographed image and compares the calculated distance with a pre-set reference distance.

According to an embodiment of the present invention, a photographing device for photographing a subject is provided. The photographing device includes a face recognition unit recognizing a face included in an image of the subject; a distance calculation unit calculating a distance between each of a plurality of faces when the plurality of faces are recognized by the face recognition unit; and a distance comparison unit comparing the distance calculated by the distance calculation unit with a pre-set reference distance.

The distance calculation unit may include a planar distance calculation unit calculating a planar distance between each of the plurality of faces.

The distance comparison unit may include a planar distance comparison unit comparing the planar distance between each of the plurality of faces with a pre-set reference planar distance, and determining propriety of the planar distance calculated by the planar distance calculation unit.

The distance calculation unit may include a front and rear distance calculation unit calculating a front and rear distance between each of the plurality of faces.

The distance comparison unit may include a front and rear distance comparison unit comparing the front and rear distance between each of the plurality of faces with a pre-set reference front and rear distance, and determining propriety of the front and rear distance calculated by the front and rear distance calculation unit.

The photographing device may further include an image input unit delivering the image of the subject to the face recognition unit.

The photographing device may further include an output unit receiving a result of the comparison from the distance comparison unit, and informing propriety of the calculated distance to a photographer.

The output unit may inform the propriety of the calculated distance to the photographer by using at least one of a monitor, a speaker, and a light emitting diode (LED).

According to another embodiment of the present invention, a method of controlling a photographing device photographing a subject is provided. The method includes (a) entering a specific mode; (b) photographing the target subject and recognizing a face included in an image of the subject; (c) calculating a distance between each of a plurality of faces when the plurality of faces are recognized from the image; and (d) comparing the calculated distance with a pre-set reference distance.

The specific mode may be one of a couple mode and a photo frame mode.

When the specific mode is set as the couple mode, (c) may include the operation of calculating a planar distance between each of the plurality of faces.

When the specific mode is set as the photo frame mode, (c) may include the operation of calculating a planar distance between each of the plurality of faces, and a front and rear distance between each of the plurality of faces.

The method may further include the operation of informing a photographer about a result of the comparing in (d).

BRIEF DESCRIPTION OF THE DRAWINGS

The above and other features and advantages of the present invention will become more apparent by describing in detail exemplary embodiments thereof with reference to the attached drawings in which:

FIG. 8 is a flowchart of an example of a method of controlling the photographing device according to another embodiment of the present invention.

DETAILED DESCRIPTION OF THE INVENTION

The present invention will now be described more fully with reference to the accompanying drawings, in which exemplary embodiments of the invention are shown.

Figure 1A:
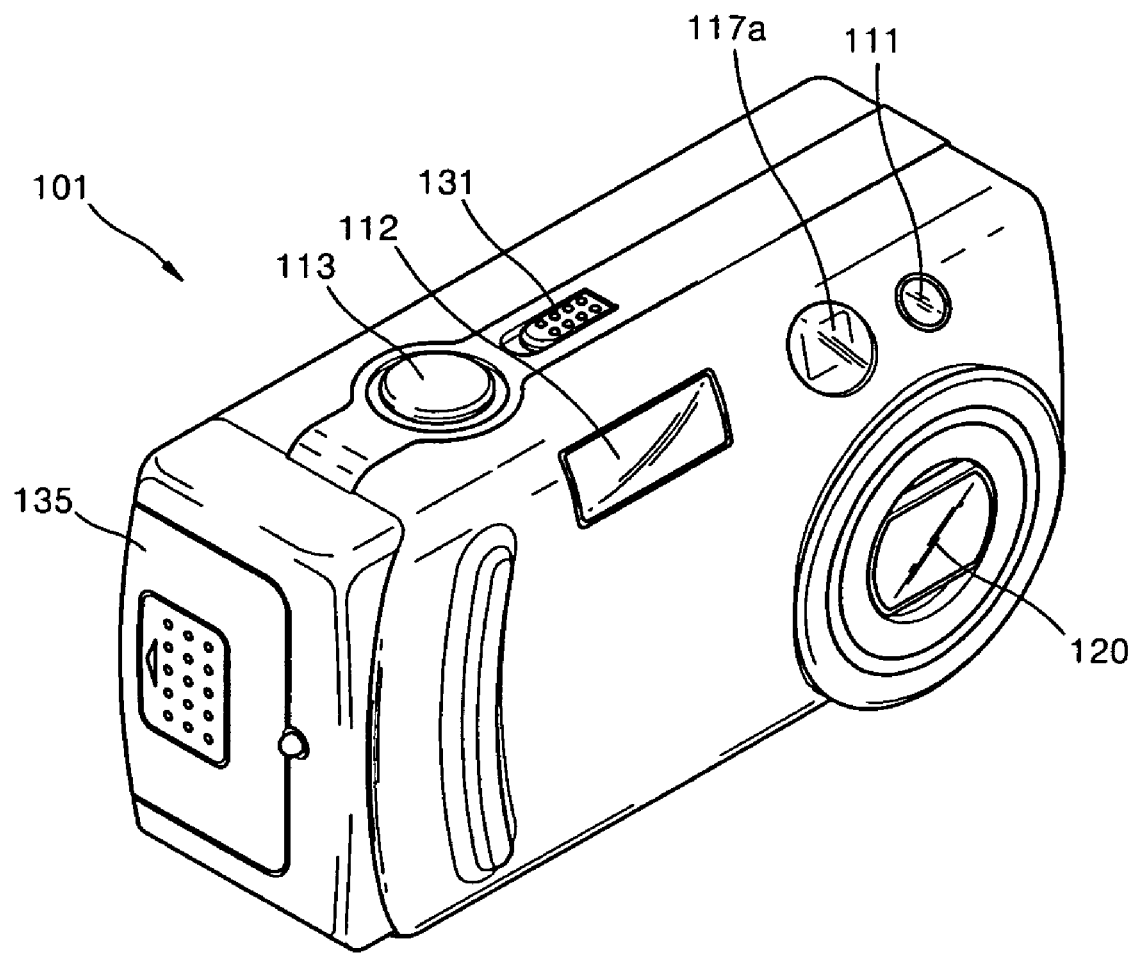
FIG. 1A is a front and top view of an example of a photographing device according to an embodiment of the present invention.

FIG. 1A is a front and top view of an example of a photographing device 101 according to an embodiment of the present invention. Referring to the example of FIG. 1A, the photographing device 101 includes a self-timer lamp 111, a flash 112, a shutter release button 113, a viewfinder 117a, a photographing lens 120, and a power switch 131 which are disposed on either a front surface or a top surface of the photographing device 101. The photographing device 101 includes a battery/memory card mounting chamber 135 disposed on its side surface. Here, the photographing device 101 includes a digital camera, and an apparatus including a digital camera, for example, a mobile communication terminal.

In a self-timer mode, the self-timer lamp 111 operates during a predetermined time period from when the shutter release button 113 is pressed to when an image is captured.

The shutter release button 113 functions in two steps. For example, when a photographer half-presses (a first step) the shutter release button 113, an autofocus (AF) signal S1 is generated from the shutter release button 113, and when the photographer fully-presses (a second step) the shutter release button 113, a photographing signal S2 is generated.

The flash 112 irradiates light for giving the light to a subject when photographing is performed in dark conditions.

Figure 1B:
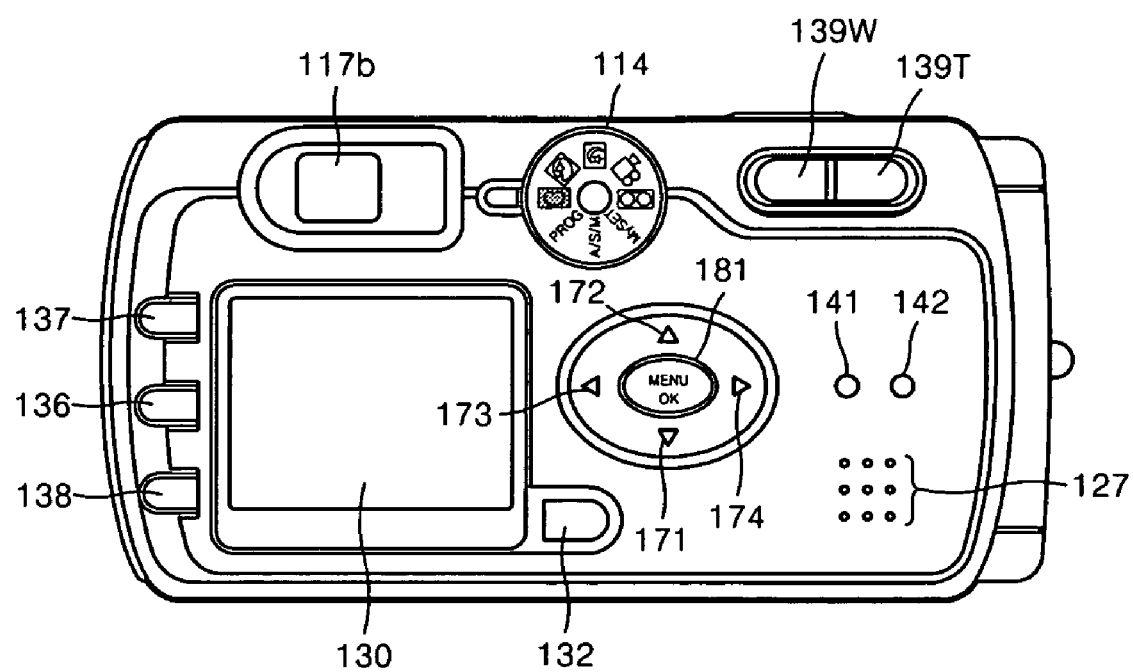
FIG. 1B is a rear view of an example of the photographing device in FIG. 1A.

The viewfinder 117a inputs light so that a photographer may view an image of the subject via a viewfinder (refer, for example, to reference numeral 117b in FIG. 1B).

An image of a subject to be photographed is input via the photographing lens 120.

The power switch 131 controls an operation of the photographing device 101.

The battery/memory card mounting chamber 135 is disposed, for example, on a side surface of the photographing device 101 so as to mount a battery and a memory card.

FIG. 1B is a rear view of an example of the photographing device 101 in FIG. 1A. Referring to the example of FIG. 1B, the photographing device 101 includes a mode dial 114, a viewfinder 117b, a speaker 127, a monitor 130, a reproduction mode button 132, a manual-focusing/delete button 136, a manual-adjusting/index mode button 137, a monitor button 138, a wide angle zoom button 139W, a telephoto zoom button 139T, direction buttons 171 through 174, a menu selection button 181, and light emitting diodes (LED's) 141 and 142 which are disposed on a rear surface of the photographing device 101.

The mode dial 114 sets camera operation modes such as a synthesis photographing mode, a program photographing mode, a portrait photographing mode, a night photographing mode, a manual photographing mode, a moving picture photographing mode, a photographer setting mode, a recording mode, a couple mode, a photo frame mode, and the like.

The monitor 130 displays an image of a subject, a message, or an operation menu of the photographing device 101, and is formed of a liquid crystal display (LCD), an organic light emitting diode (OLED), or the like.

The reproduction mode button 132 is used to reproduce stored images or to enter a preview mode.

In a photographing mode, a photographer uses the manual-focusing/delete button 136 to manually perform focusing or to perform a delete operation.

The manual-adjusting/index mode button 137 is used to manually adjust specific conditions and to select an index mode.

A photographer uses the monitor button 138 to control an operation of the monitor 130. For example, in the photographing mode, when the photographer first presses the monitor button 138, a subject image and photographing information thereof are displayed on the monitor 130. When the photographer presses the monitor button 138 a second time, power applied to the monitor 130 is cut off. Also, when an image file is being reproduced in a reproduction mode, if the photographer first presses the monitor button 138, photographing information regarding the reproduced image file is displayed on the monitor 130, and if the photographer presses the monitor button 138 a second time, only the image file is displayed.

When the wide angle zoom button 139W is pressed, a focal length of a zoom lens becomes shorter so that a viewing angle becomes wider. When the telephoto zoom button 139T is pressed, the focal length of the zoom lens becomes longer so that the viewing angle becomes smaller.

The menu selection button 181 is used to display the operation menu of the photographing device 101. The direction buttons 171 through 174 are used to move a cursor in up and down, right and left directions. That is, when a photographer presses the menu selection button 181, a menu for setting a condition of a specific operation mode is displayed. At this time, when the photographer presses the down direction button 171, the cursor moves in the down direction, and when the photographer presses the up direction button 172, the cursor moves in the up direction. Also, if the photographer presses the menu selection button 181 when the cursor positions on a selection item, an operation corresponding to the selection item is performed. For example, if the photographer presses the menu selection button 181 when the synthesis photographing mode is selected, an image selection menu is displayed. Accordingly, the photographer may select a desired auxiliary image by manipulating the down and up direction buttons 171 and 172, and may input a selection confirm signal by pressing the menu selection button 181.

The LED's 141 and 142 turn specific colors when the LED's 141 and 142 are ON. For example, the LED 141 may turn blue and the LED 142 may turn red.

Figure 2:
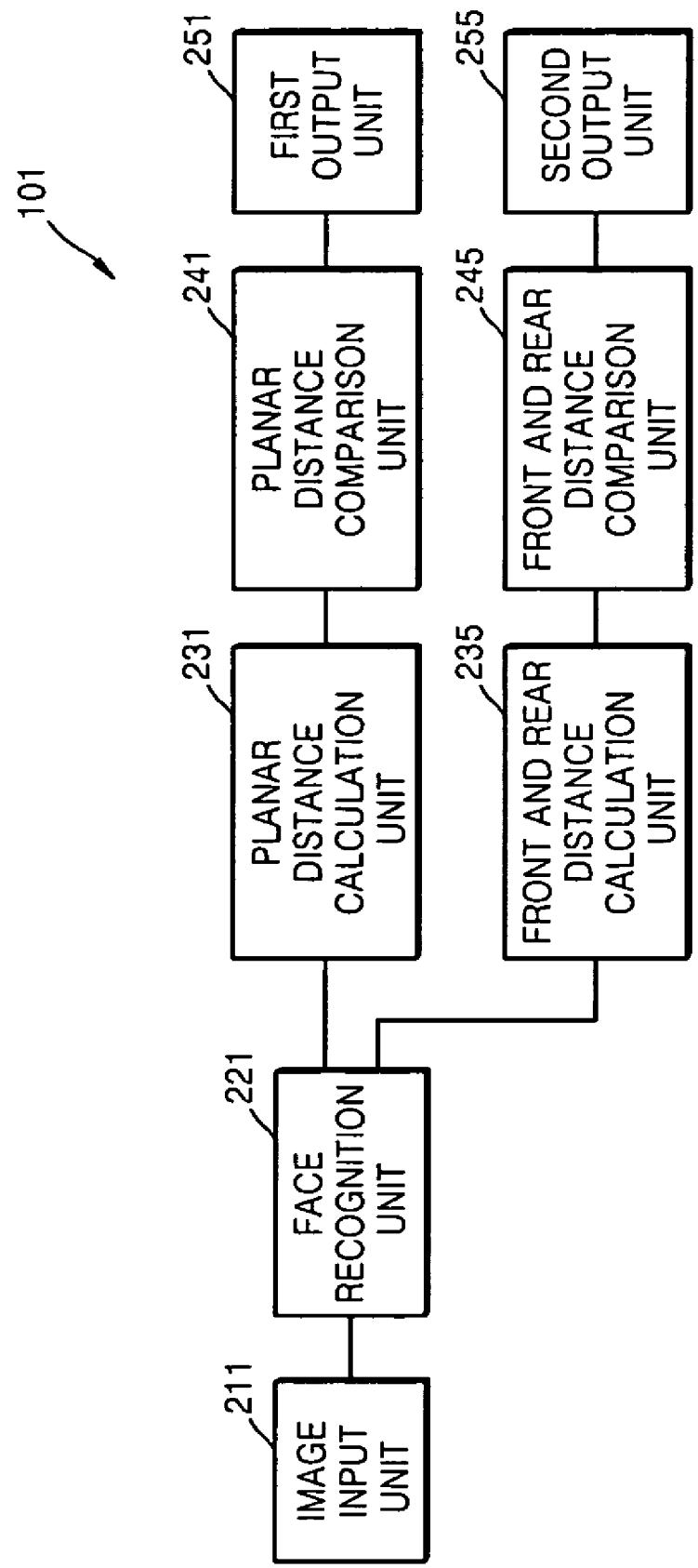
FIG. 2 is a block diagram of an example of the photographing device in FIG. 1A.

FIG. 2 is a block diagram of an example of the photographing device 101 in FIG. 1A. Referring to FIG. 2, the photographing device 101 includes an image input unit 211, a face recognition unit 221, a planar distance calculation unit 231, a planar distance comparison unit 241, a first output unit 251, a front and rear distance calculation unit 235, a front and rear distance comparison unit 245, and a second output unit 255.

Figure 3:
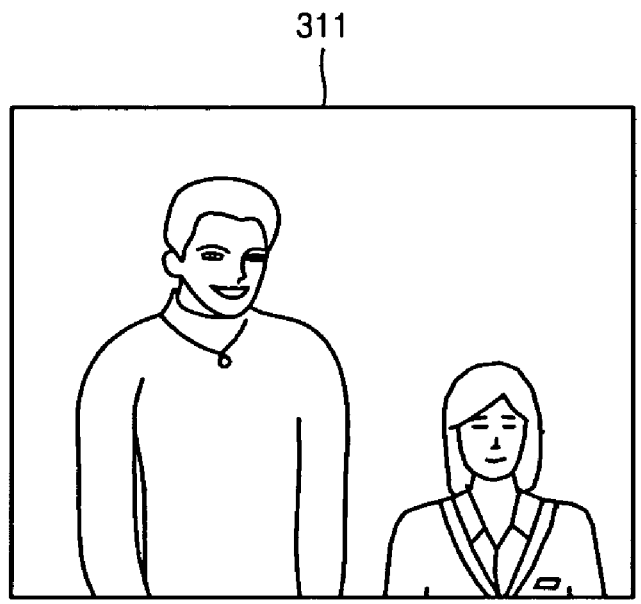
FIG. 3 is an example of an image photographed by the photographing device in FIG. 1A.

FIG. 3 is an example of an image photographed by the photographing device in FIG. 1A. The image input unit 211 inputs a subject image 311 (see FIG. 3) via the photographing lens 120. That is, when a photographer half-presses (a first step) or fully-presses (a second step) the shutter release button 113, an image of a subject is input to the image input unit 211 via the photographing lens 120.

Figure 4:
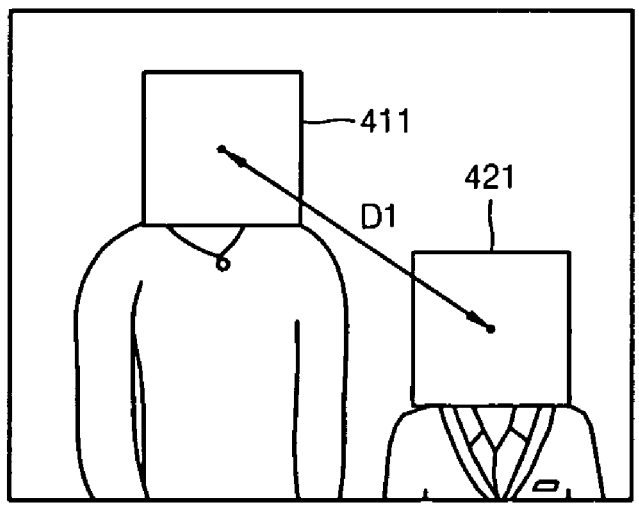
FIG. 4 is a diagram for describing an example of the calculation of a planar distance between each of the faces recognized by a face recognition unit in FIG. 2.
Figure 5:
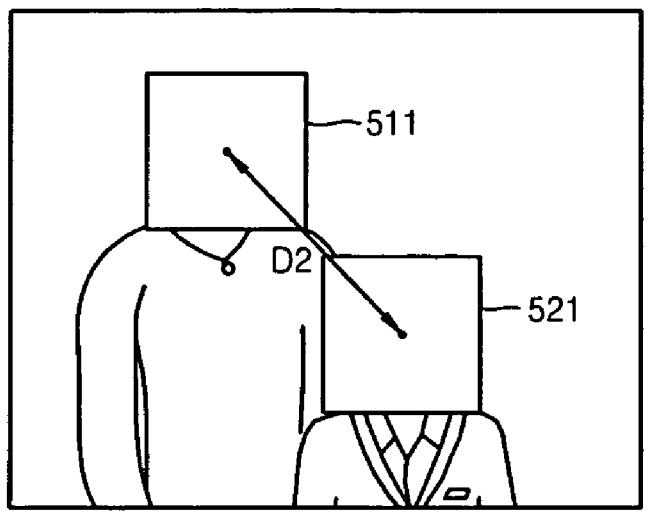
FIG. 5 is a diagram for describing an example of a calculation of a front and rear distance between each of the faces recognized by the face recognition unit in FIG. 2.
Figure 6:
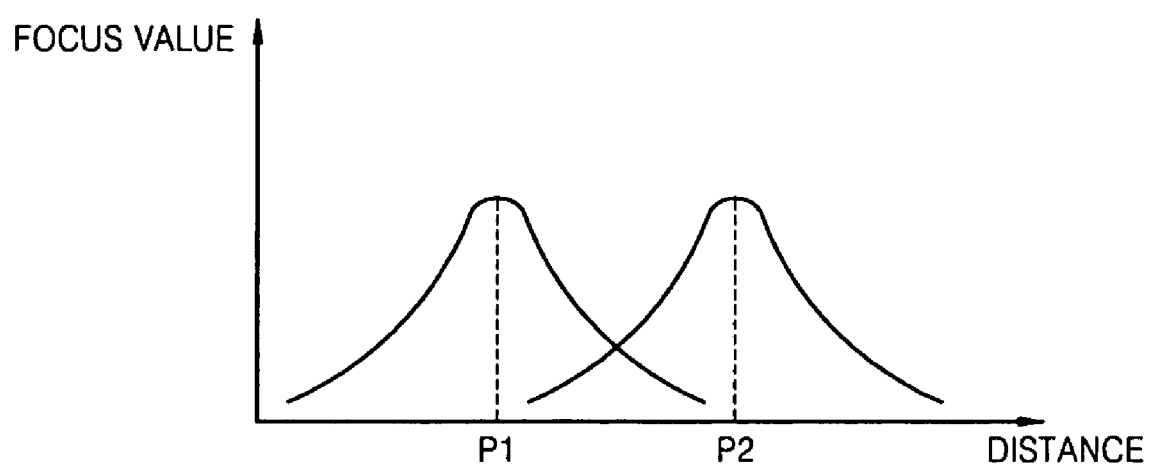
FIG. 6 is a diagram for describing an example of a calculation of a front and rear distance between each of faces, performed by a front and rear distance calculation unit in FIG. 2.

FIG. 4 is a diagram for describing an example of the calculation of a planar distance between each of the faces recognized by a face recognition unit in FIG. 2. FIG. 5 is a diagram for describing an example of a calculation of a front and rear distance between each of the faces recognized by the face recognition unit in FIG. 2. FIG. 6 is a diagram for describing an example of a calculation of a front and rear distance between each of faces, performed by a front and rear distance calculation unit in FIG. 2.

The face recognition unit 221 recognizes a human face from the image input to the image input unit 211. The image may include various kinds of objects as well as humans, and the face recognition unit 221 recognizes faces of the humans from the image. When the faces are recognized, the face recognition unit 221 indicates the faces by using a specific shape such as a quadrangle, as illustrated in FIGS. 4 and 5. By indicating the faces with the specific shape, it is easy to calculate a planar distance and a front and rear distance between each of the faces. Face recognition technology is well-known technology, thus, a further description thereof is omitted here.

The planar distance calculation unit 231 functions as a distance calculation unit, and calculates a planar distance between each face recognized by the face recognition unit 221. Here, the planar distance is a concept in contrast with the front and rear distance, and means a distance between each of faces included in a planar image realized by the image input unit 211. That is, a three-dimensional (3D) image of a subject is input to the image input unit 211 via the photographing lens 120 so as to become the planar image, and the face recognition unit 221 recognizes the faces from the planar image. Thus, the planar distance calculation unit 231 calculates the distance between each of faces included in the planar image of the subject. As illustrated in FIG. 4, the planar distance calculation unit 231 calculates a distance D1 between a center of a first quadrangle 411 and a center of a second quadrangle 421 so as to calculate a planar distance between each of faces, wherein the first and second quadrangles 411 and 421 represent the faces.

If the planar image includes two faces, a planar distance between the two faces is calculated. If the planar image includes three or more faces, planar distances between each two adjacent faces from among the three or more faces are individually calculated. At this time, the planar distance calculation unit 231 first arbitrarily selects two faces and calculates a planar distance between the two faces in such a manner that the planar distance calculation unit 231 calculates all of the planar distances between the three or more faces.

The planar distance comparison unit 241 functions as a distance comparison unit, compares a planar distance between each of faces with a reference planar distance, and determines propriety of the planar distance calculated by the planar distance calculation unit 231. The reference planar distance is a default value set in the photographing device 101, according to the type of each person included in an image. For example, if two people are a couple, the reference planar distance is set to be relatively short so as to reflect affection, and if the two people are not a couple, but instead are friends or acquaintances, the reference planar distance is set to be relatively long so as to reflect familiarity. The reference planar distance may be arbitrarily set by a photographer.

The first output unit 251 informs the photographer of a comparison result from the planar distance comparison unit 241 by displaying the comparison result on the monitor 130, by outputting a sound with respect to the comparison result via the speaker 127, or by turning on one of the LED's 141 and 142. For example, if the planar distance between each of faces is less than the reference planar distance, the first output unit 251 displays a photographing allowance message on the monitor 130, outputs a sound via the speaker 127, or turns the LED 141 blue. If the planar distance between each of the faces is greater than the reference planar distance, the first output unit 251 displays a warning message on the monitor 130, outputs a sound via the speaker 127, or turns the LED 142 red. By doing so, the first output unit 251 informs the photographer of the comparison result.

In this manner, the photographing device 101 calculates a planar distance between each face of each person to be photographed, and informs a photographer of the planar distance so that the photographer may appropriately adjust the planar distance between each of the faces and may photograph a picture.

The front and rear distance calculation unit 235 functions as a distance calculation unit, and calculates a front and rear distance between each of the faces recognized by the face recognition unit 221. If the image includes two faces, the front and rear distance calculation unit 235 calculates a front and rear distance between the two faces. If the image includes three or more faces, the front and rear distance calculation unit 235 calculates front and rear distances between each two adjacent faces from among the three or more faces. At this time, the front and rear distance calculation unit 235 first arbitrarily selects two faces and calculates a front and rear distance between the two faces in such a manner that the front and rear distance calculation unit 235 calculates all of the front and rear distances between the three or more faces. In order to calculate a front and rear distance between each face, as illustrated in FIG. 5, the front and rear distance calculation unit 235 calculates a distance D2 between a center of a third quadrangle 511 and a center of a fourth quadrangle 521, wherein the third and fourth quadrangles 511 and 521 represent the faces.

The front and rear distance may be calculated using an AF method. That is, as illustrated in the example of FIG. 6, a value P1 of a correct focus with respect to a first person is calculated and then is converted into a distance between the photographing device 101 and the first person. After that, a value P2 of a correct focus with respect to a second person is calculated and then is converted into a distance between the photographing device 101 and the second person. A front and rear distance between the first person and the second person is obtained by subtracting the value P1 from the value P2.

The front and rear distance comparison unit 245 functions as a distance comparison unit, compares a front and rear distance between each of the faces with a reference front and rear distance, and determines a propriety of the front and rear distance calculated by the front and rear distance calculation unit 235. The reference front and rear distance is a default value set in the photographing device 101, according to types of the operation modes. For example, in the couple mode, the reference front and rear distance is set to be relatively short so as to reflect affection of a couple, and in the photo frame mode, the reference front and rear distance is set to be relatively long so as to indicate positions of people. The reference front and rear distance may be set according to two cases. That is, in the first case where a front and rear distance is calculated from an image, the reference front and rear distance may be determined after a test and may preferably have a value less than 50. In the second case where the front and rear distance is calculated using the AF method, the reference front and rear distance may be determined after a test and may preferably have a value between 1M through 3M. The reference front and rear distance may be arbitrarily set by a photographer.

The second output unit 255 informs the photographer of a comparison result from the front and rear distance comparison unit 245 by displaying the comparison result on the monitor 130, by outputting a sound with respect to the comparison result via the speaker 127, or by turning on one of the LED's 141 and 142. For example, if a front and rear distance between each of the persons is less than the reference front and rear distance, the second output unit 255 displays a photographing allowance message on the monitor 130, outputs a sound via the speaker 127, or turns the LED 141 blue. If the front and rear distance between each of the persons is greater than the reference front and rear distance, the second output unit 255 displays a warning message on the monitor 130, outputs a sound via the speaker 127, or turns the LED 142 red. By doing so, the second output unit 255 informs the photographer of the comparison result.

The first output unit 251 and the second output unit 255 may be assembled together so as to be formed as one output unit. Also, the planar distance comparison unit 241 and the front and rear distance comparison unit 245 may be formed as one comparison unit.

In this manner, the photographing device 101 calculates a front and rear distance between each face of each person to be photographed, and informs a photographer of the front and rear distance so that the photographer may appropriately adjust the front and rear distance between each of the faces and may photograph a picture.

Figure 7:
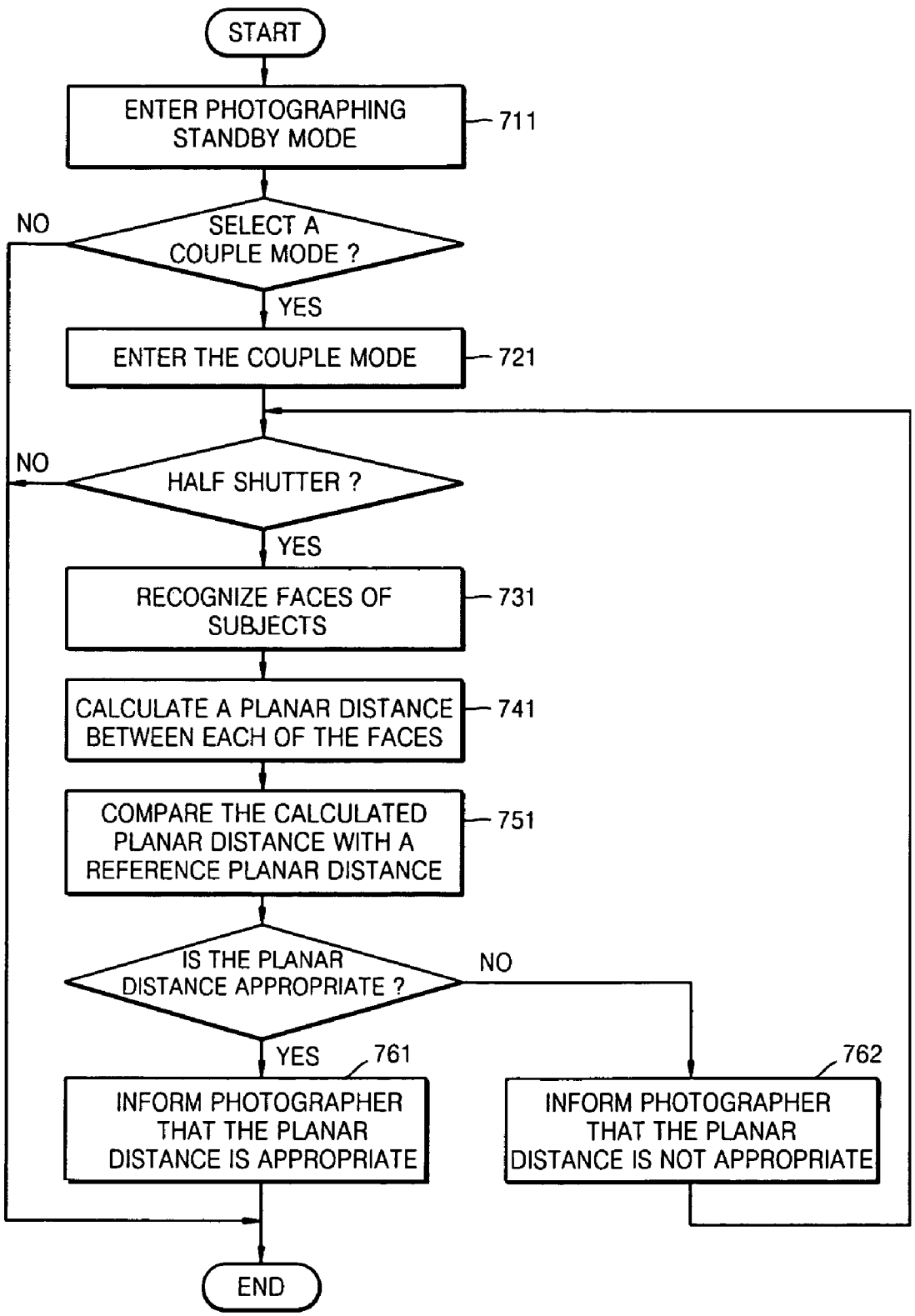
FIG. 7 is a flowchart of an example of a method of controlling the photographing device according to an embodiment of the present invention.

FIG. 7 is a flowchart of an example of a method of controlling the photographing device 101 according to an embodiment of the present invention. By referring to FIGS. 1A through 4, the method of controlling the photographing device 101 will now be described.

In a first operation (711), a photographing device (refer, for example, to reference numeral 101 in FIG. 2) enters a photographing standby mode. That is, when a photographer turns on a power switch (refer, for example, to reference numeral 131 in FIG. 1A) of the photographing device, the photographing device enters the photographing standby mode.

In a second operation (721), the photographing device enters a couple mode. That is, when the photographer manipulates a mode dial (refer, for example, to reference numeral 114 in FIG. 1B) and selects the couple mode, the photographing device enters the couple mode. If the photographer does not select the couple mode but selects another mode, the photographing device performs an operation according to the other mode.

In a third operation (731), a face recognition unit (refer, for example, to reference numeral 221 in FIG. 2) recognizes faces of subjects. That is, when the photographer half-presses (a first step that is a half-shutter press) a shutter release button (refer to reference numeral 113 in FIG. 1A), the subject image 311 (see FIG. 3) is input to an image input unit (refer, for example, to reference numeral 211 in FIG. 2) via a photographing lens (refer, for example, to reference numeral 120 in FIG. 1A), the face recognition unit recognizes faces of people included in the subject image 311. The couple mode is necessary when the target subjects basically have two faces, thus, the face recognition unit recognizes the two faces. Here, unless the photographer presses the shutter release button, the photographing device constantly maintains the couple mode. However, if the photographer fully-presses (a second step) the shutter release button, the photographing device immediately photographs the target subjects.

In a fourth operation (741), a planar distance calculation unit (refer, for example, to reference numeral 231 in FIG. 2) calculates a planar distance between each of the faces. That is, as illustrated in the example of FIG. 4, the planar distance calculation unit calculates the distance Dl between the two faces 411 and 421, which are included in an image.

In a fifth operation (751), a planar distance comparison unit (refer, for example, to reference numeral 241 in FIG. 2) compares the calculated planar distance with a reference planar distance that is pre-set in the photographing device.

In a sixth operation (761 and 762), a first output unit (refer, for example, to reference numeral 251 in FIG. 2) informs the photographer of the comparison result output by the planar distance comparison unit. That is, if the planar distance between the two faces is less than the reference planar distance, the first output unit displays a message on a monitor (refer, for example, to reference numeral 130 in FIG. 1 B), wherein the message indicates that the planar distance between the two faces is appropriate, outputs a sound via a speaker (refer, for example, to reference numeral 127 in FIG. 1B), or turns an LED (refer, for example, to reference numeral 141 in FIG. 1B) blue. If the planar distance between the two faces is greater than the reference planar distance, the first output unit displays a message on the monitor, wherein the message indicates that the planar distance between the two faces is not appropriate, outputs a sound via the speaker, or turns an LED (refer, for example, to reference numeral 142 in FIG. 1B) red.

In this manner, when the photographing device is set as the couple mode and when the photographer half-presses (a first step) the shutter release button, the photographing device informs a propriety of the planar distance between the two faces to the photographer via the monitor, the speaker, or the LED's.

Thus, in the case where a planar distance between faces of a couple included in a subject image is not appropriate, the photographer may adjust positions of the faces and then may photograph a picture after the planar distance between the faces is appropriately adjusted.

FIG. 8 is a flowchart of an example of a method of controlling the photographing device 101 according to another embodiment of the present invention. By referring to FIGS. 1A through 2, the method of controlling the photographing device 101 will now be described.

In a first operation (811), a photographing device (refer, for example, to reference numeral 101 in FIG. 2) enters a photographing standby mode. That is, when a photographer turns on a power switch (refer, for example, to reference numeral 131 in FIG. 1A) of the photographing device, the photographing device enters the photographing standby mode.

In a second operation (821), the photographing device enters a photo frame mode. That is, when the photographer manipulates a mode dial and selects the photo frame mode, the photographing device enters the photo frame mode. If the photographer does not select the photo frame mode but selects another mode, the photographing device performs an operation according to the other mode.

In a third operation (831), a face recognition unit (refer, for example, to reference numeral 221 in FIG. 2) recognizes faces of subjects. That is, when the photographer half-presses (a first step that is a half-shutter press) a shutter release button (refer to reference numeral 113 in FIG. 1A), the subject image 311 (see FIG. 3) is input to an image input unit (refer, for example, to reference numeral 211 in FIG. 2) via a photographing lens (refer, for example, to reference numeral 120 in FIG. 1A), the face recognition unit recognizes faces of people included in the subject image 311. The photo frame mode is utilized to photograph a plurality of faces of people, thus, the face recognition unit recognizes the plurality of faces. Here, unless the photographer presses the shutter release button, the photographing device constantly maintains the photo frame mode. However, if the photographer fully-presses (a second step) the shutter release button, the photographing device immediately photographs the target subjects.

In a fourth operation (841), a planar distance calculation unit (refer, for example, to reference numeral 231 in FIG. 2) calculates a planar distance between each of the faces. That is, as illustrated in FIG. 4, the planar distance calculation unit calculates the distance Dl between the two faces 411 and 421, which are included in an image. In the case where the image includes three or more faces, planar distances between the three or more faces are individually calculated. Also, a front and rear distance calculation unit (refer, for example, to reference numeral 235 in FIG. 2) calculates a front and rear distance between each of the faces. That is, as illustrated in FIG. 5, the front and rear distance calculation unit calculates the distance D2 that is a front and rear distance between the two faces 511 and 521 which are included in an image. In the case where an image includes three or more faces, front and rear distances between the three or more faces are all calculated.

In a fifth operation (851), a planar distance comparison unit (refer, for example, to reference numeral 241 in FIG. 2) compares the calculated planar distance with a reference planar distance that is pre-set in the photographing device, and a front and rear distance comparison unit (refer, for example, to reference numeral 245 in FIG. 2) compares the calculated front and rear distance with a reference front and rear distance that is pre-set in the photographing device.

In the sixth operation (861 and 862), a first output unit (refer, for example, to reference numeral 251 in FIG. 2) and a second output unit (refer, for example, to reference numeral 255 in FIG. 2) inform the photographer of the comparison results. That is, if the planar distance between the two faces is less than the reference planar distance, or if the front and rear distance between the two faces is less than the reference front and rear distance, the first output unit or the second output unit displays a message on a monitor (refer, for example, to reference numeral 130 in FIG. 1B), wherein the message indicates that the planar distance or the front and rear distance between the two faces is appropriate, outputs a sound via a speaker (refer to reference numeral 127 in FIG. 1B), or turns an LED (refer, for example, to reference numeral 141 in FIG. 1B) blue. If the planar distance between the two faces is greater than the reference planar distance, or if the front and rear distance between the two faces is greater than the reference front and rear distance, the first output unit or the second output unit displays a message on the monitor, wherein the message indicates that the planar distance or the front and rear distance between the two faces is not appropriate, outputs a sound via the speaker, or turns an LED (refer, for example, to reference numeral 142 in FIG. 1B) red.

In this manner, when the photographing device is set as the photo frame mode and when the photographer half-presses (the first step) the shutter release button, the photographing device informs the photographer of a propriety of the planar distance between the two faces and a propriety of the front and rear distance between the two faces via the monitor, the speaker, or the LED's.

Thus, in the case where a planar distance or a front and rear distance between faces included in a subject image is not appropriate, the photographer may adjust the positions of the faces and then may proceed with photographing a picture after the planar distance or the front and rear distance between the faces has been appropriately adjusted.

The photographing device and the method of controlling the photographing device according to the embodiments of the present invention can calculate a distance between each of the faces included in a target subject image and can compare the calculated distance with a pre-set reference distance, thereby enabling the photographing of a picture when the distance between each of the faces is appropriate.

While this invention has been particularly shown and described with reference to exemplary embodiments thereof, it will be understood by those of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A photographing device photographing a subject, the photographing device configured to be operable in a specific mode and comprising:
    a face recognition unit recognizing a face included in an image of the subject;
    a distance calculation unit calculating a distance between each of a plurality of faces when the plurality of faces are recognized by the face recognition unit; and
    a distance comparison unit comparing the distance calculated by the distance calculation unit with a pre-set reference distance,
    wherein the distance calculation unit comprises a planar distance calculation unit calculating a planar distance between each of the plurality of faces when the specific mode is set as a couple mode.

2. The photographing device of claim 1, wherein the distance comparison unit comprises a planar distance comparison unit comparing the planar distance between each of the plurality of faces with a pre-set reference planar distance and determining propriety of the planar distance calculated by the planar distance calculation unit.

3. The photographing device of claim 1, further comprising an image input unit delivering the image of the subject to the face recognition unit.

4. The photographing device of claim 1, further comprising an output unit receiving a result of the comparison from the distance comparison unit, and informing propriety of the calculated distance to a photographer.

5. The photographing device of claim 4, wherein the output unit informs the propriety of the calculated distance to the photographer by using at least one of a monitor, a speaker, and a light emitting diode.

6. A photographing device photographing a subject, the photographing device configured to be operable in a specific mode and comprising:
- a face recognition unit recognizing a face included in an image of the subject;
- a distance calculation unit calculating a distance between each of a plurality of faces when the plurality of faces are recognized by the face recognition unit; and
- a distance comparison unit comparing the distance calculated by the distance calculation unit with a pre-set reference distance,
- wherein the distance calculation unit comprises a front and rear distance calculation unit calculating a front and rear distance between each of the plurality of faces when the specific mode is set as a photo frame mode.

7. The photographing device of claim 6, wherein the distance comparison unit comprises a front and rear distance comparison unit comparing the front and rear distance between each of the plurality of faces with a pre-set reference front and rear distance and determining propriety of the front and rear distance calculated by the front and rear distance calculation unit.

8. The photographing device of claim 6, further comprising an image input unit delivering the image of the subject to the face recognition unit.

9. The photographing device of claim 6, further comprising an output unit receiving a result of the comparison from the distance comparison unit, and informing propriety of the calculated distance to a photographer.

10. The photographing device of claim 9, wherein the output unit informs the propriety of the calculated distance to the photographer by using at least one of a monitor, a speaker, and a light emitting diode.

11. A method of controlling a photographing device photographing a subject, the method comprising:
- (a) entering a specific mode;
- (b) photographing a target subject and recognizing a face included in an image of the subject;
- (c) calculating a distance between each of a plurality of faces when the plurality of faces are recognized from the image; and
- (d) comparing the calculated distance with a pre-set reference distance,
- wherein the specific mode is one of a couple mode and a photo frame mode, and
- wherein (c) comprises calculating a planar distance between each of the plurality of faces when the specific mode is set as the couple mode.

12. The method of claim 11, further comprising informing a photographer about a result of the comparing in (d).

13. A method of controlling a photographing device photographing a subject, the method comprising:
- (a) entering a specific mode;
- (b) photographing a target subject and recognizing a face included in an image of the subject;
- (c) calculating a distance between each of a plurality of faces when the plurality of faces are recognized from the image; and
- (d) comparing the calculated distance with a pre-set reference distance,
- wherein the specific mode is one of a couple mode and a photo frame mode, and
- wherein (c) comprises calculating a planar distance between each of the plurality of faces, and a front and rear distance between each of the plurality of faces when the specific mode is set as the photo frame mode.

14. The method of claim 13, further comprising informing a photographer about a result of the comparing in (d).

\* \* \* \* \*